United States Patent Office 3,241,486
Patented Mar. 22, 1966

3,241,486
NEW PLANOGRAPHIC PRINTING PLATE AND METHOD FOR PRODUCING SAME
Paul W. Greubel, Great Neck, N.Y., and William J. Russell, Dover, N.J., assignors to Interchemical Corporation, New York, N.Y., a corporation of Ohio
No Drawing. Filed Sept. 28, 1961, Ser. No. 141,538
8 Claims. (Cl. 101—149.2)

This invention relates to a new planographic printing plate as well as a novel process for producing the same. More particularly, it relates to a new planographic printing plate which may be used in a new planographic process which eliminates the water fountain solution used in lithographic printing, thereby permitting the use of inks other than oil inks, resin-hydrocarbon inks or oleoresinous inks in planographic printing.

All existing planographic printing methods are lithographic in nature depending upon the mutual immiscibility of oil and water. Based on this principle, existing planographic printing employs a plate in which the non-image areas on the surface are of a water attractive material. Thus, when prior to the application of ink to the plate, water from a fountain solution is applied to the plate, it is attracted to and retained over the non-image areas. Accordingly, when the oil or "greasy" ink is applied to the plate prior to printing, it is prevented from depositing on the non-image areas and only covers the image area forming the characteristic lithographic greasy image which is subsequently transferred either directly to the stock being printed, or as in offset printing, to a rubber blanket from which it is then re-transferred to the stock being printed.

While lithographic printing produces an image of excellent fidelity and is widely used where fine printing is required, the oil and oleoresinous inks in lithography have objectionable odors which render the lithographed material unsuitable for many purposes, particularly for food packaging of many kinds.

Attempts to reduce or eliminate the odor of lithographic inks in the past have always been hampered by the requirement that the inks be oily or oleoresinous in order to have the hydrophobicity, required of lithographic inks. Copending application entitled "A New Method for Planographic Printing," S.N. 141,540 filed by Paul W. Greubel on the same date as the present application, now U.S. Patent No. 3,167,005, discloses a new planographic printing method permitting the use of substantially odorless non-oily or non-oleoresinous inks. This novel method is based upon the mutual immiscibility between volatile aliphatic hydrocarbons and odorless non-oily and non-oleoresinous inks. This novel method which employs a volatile hydrocarbon fountain solution which when applied to the plate covers the non-image areas thereof requires a planographic plate in which the non-image areas are retentive of the volatile hydrocarbon while the image areas are preferably wetted by the ink.

This invention provides a novel lithographic plate which meets the requirements of the above referred to novel process. The planographic plate of this invention comprises a base metal plate which may be suitably made of zinc having a printing surface on which the image areas are the exposed metal and the non-image areas are coated with a silicone. It will be obvious to those skilled in the art that other conventional lithographic plate metals such as aluminum may be used for the base metal. The silicones preferably used to coat the non-image areas are thermosetting alkyl and aryl substituted polysiloxanes including thermosetting alkyl siloxanes such as dimethyl-polysiloxane resin, thermosetting alkyl-aryl polysiloxanes, for example a methyl-phenylpolysiloxane resin having an average degree of substitution of 1.3 methyl and phenyl radicals per silicone atom. Very good results have been achieved with a thermosetting polysiloxane copolymer comprising 37% by weight of dimethylsiloxane units $((CH_3)_2SiO)$, 56% of phenyl siloxane units $(C_6H_5SiO_{1.5})$ and 7% methyl siloxane $(CH_3SiO_{1.5})$ units.

It has been further found that incorporation of small amounts preferably from 1 to 16% (based upon the weight of the silicone) of tetrafluoroethylene resin marketed under the trademark "Teflon" (Dupont) into the silicone will increase the durability of the silicone coating on the plate. Rudimentary plates which satisfactorily demonstrate the principles of this invention may be prepared by the direct application of an image stencil to the plate surface thereby masking off the image areas and then applying a coating of the silicone composition to the unmasked areas and curing the coating by baking.

However, in order to attain fidelity equivalent to that of commercial lithography, the novel plates may be prepared by a novel photographic process which is a modification of the conventional deep-etch process used to prepare photolithographic plates. This novel process exposes the plate through negatives instead of the positives required in conventional deep-etch photolithography. The grained surface of the metal base is counteretched or cleaned with a weak acid solution in accordance with conventional photolithographic "deep-etch" procedures. Still following these conventional procedures, the plate surface is coated with a "deep-etch" coating which comprises a light sensitive film of gum arabic and a bichromate such as ammonium bichromate. Some conventional coating formulas are described on p. 61 of L.T.F. (Lithographic Technical Foundation) publication "Offset Platemaking—Deep-Etch Process" published 1955. The coating is preferably applied while the plate is in a whirler. The plate is allowed to remain in the whirler until the coating is dry.

Then the sensitized surface is placed under a negative having a transparent pattern in an opaque field and exposed through the negative to strong light such as an arc light. This exposure hardens the light sensitive coating on the image areas. The plate surface is then treated with a developer conventionally used in the "deep-etch" process such as an aqueous solution of calcium chloride and lactic acid or a zinc chloride calcium chloride and lactic acid solution. Some conventional developer formulas are given on p. 105 of the above referred to L.T.F. publication. The developer is applied and rubbed gently for 1½ minutes. Developing removes the unhardened bichromated-gum coating from the non-image areas of the plate.

The next step is deep etching of the plate. While this step may be omitted, for best results, it is preferable to treat with a deep etching solution for about one minute. This solution contains a strong acid that attacks and eats away some of the exposed metal in the non-image areas thereby insuring better adhesiveness of the silicone to be subsequently applied. Some conventional deep etching solutions are given on p. 114 of the above described L.T.F. publication. The deep etched non-image areas are then cleaned with anhydrous ethyl alcohol to remove all traces of moisture and water soluble salts. Other solvents may be used in place of anhydrous ethyl alcohol. These are described on p. 119 of the above described L.T.F. publication.

The silicon coating is then applied to the surface of the plate by spreading the coating with rags or gauze and is allowed to air dry for from 5 to 15 minutes. It should be pointed out, here, that if the silicone composition is too viscous to be spread easily, it may be diluted with a volatile organic solvent such as xylene or toluene. The coated plate is then immersed in water at 90° to 100° F. and scrubbed with a hard brush. The hardened bichromate-gum arabic coating covering the image area, being water soluble, dissolves carrying with it any silicone which may be coated over it and exposing the bare metal in the image areas.

The plate is then heated to a temperature sufficiently high to thermoset the silicone coating. This is preferably accomplished by baking the plate at temperatures preferably in the range of from about 500° F. to 700° F. for periods advantageously ranging from 5 to 90 minutes. The time required for the bake varies inversely with the temperature. For example, when the baking is carried out at 500° F., the time required is about 90 minutes. However, when the temperature is raised to 670° F. the baking time is lowered to 5 minutes. Alternatively, the silicone coating may be heated to set by flame curing. Convenient temperatures for flame curing are in the order of 750° to 800° F. for times in the order of 2 to 6 seconds.

In determining the temperatures to which the plates should preferably be heated, those skilled in the art will bear in mind the melting points of the metals used in the plates. Obviously, the selected temperatures should not approach the melting points of the metals.

While the novel photolithographic method for producing the plates has been described in detail, applicants wish to note that other photolithographic methods may be used in preparing the plates of this invention, e.g., techniques for preparing standard surface lithographic plates may be adapted to preparing the plates of this invention.

Other variations may, of course, be made in this invention and it is intended to cover such variations in the claims which follow.

What is claimed is:

1. A planographic printing plate comprising a metal surface carrying a discontinuous cured layer of a thermosetting silicone resin including from 1 to 16% of tetrafluoroethylene resin based upon the weight of the silicone, the discontinuities in said layer being areas of exposed metal surface corresponding to a selected image to be printed.

2. The method of making a planographic printing plate comprising coating a metal plate surface with a light sensitive coating, exposing said coating to light through a negative having a transparent image pattern in an opaque field, developing the coating to remove the unexposed coating from the non-image areas, coating the plate surface with a thermosetting silicone resin, applying water to the coated plate surface and scrubbing said surface, thereby removing the underlayer of the exposed light sensitive coating together with the overlayer of silicone from the image areas to expose the metal surface in such areas and applying heat to thermoset the silicone layer.

3. The method claimed in claim 2, wherein said metal surface is grained zinc.

4. The method claimed in claim 2, which further includes applying an etchant to the exposed metal surface in the non-image areas subsequent to developing and prior to applying the silicone coating.

5. The method claimed in claim 2, wherein said thermosetting silicone resin is a polysiloxane comprising at least one monomer selected from the group consisting of alkyl siloxanes and aryl siloxanes.

6. The method claimed in claim 5, wherein said thermosetting polysiloxane comprises dimethylpolysiloxane monomers.

7. The method claimed in claim 5, wherein said thermosetting polysiloxane is methylphenylpolysiloxane.

8. The method claimed in claim 5, wherein said thermosetting polysiloxane comprises dimethyl siloxane monomers, phenyl siloxane monomers and methylsiloxane monomers.

References Cited by the Examiner

UNITED STATES PATENTS

| | | | |
|---|---|---|---|
| 2,258,956 | 10/1941 | Misuraca | 101—149.2 |
| 2,804,388 | 8/1957 | Marron et al. | |
| 3,167,005 | 1/1965 | Greubel | 101—149.2 |

OTHER REFERENCES

Gruebel, P. W.: "Can Lithography be Reversed?" in Modern Lithography, November 1963 pages 35 and 36. Copy in 101—149.2.

DAVID KLEIN, *Primary Examiner.*

WILLIAM B. PENN, *Examiner.*